United States Patent

Ronning

[11] 3,800,883
[45] Apr. 2, 1974

[54] MANUAL MATERIAL SPREADER AND LEVELER

[76] Inventor: Jacob A. Ronning, 3525 Irving Ave. South, Minneapolis, Minn. 55408

[22] Filed: Dec. 26, 1972

[21] Appl. No.: 318,500

[52] U.S. Cl................ 172/371, 172/376, 15/236 R
[51] Int. Cl.......................................... A01b 1/00
[58] Field of Search .......... 172/360, 361, 365, 366, 172/371, 372, 375, 387, 376, 380, 780, 787, 199; 15/236 R, 235.4

[56] References Cited
UNITED STATES PATENTS

| | | | |
|---|---|---|---|
| 2,983,060 | 5/1961 | Rosselot | 172/199 |
| 3,225,837 | 12/1965 | Richards | 172/371 |
| 979,047 | 12/1910 | Swagerty et al. | 172/387 |
| 3,052,998 | 9/1962 | Childers | 172/780 |
| 3,719,234 | 3/1973 | Neece | 172/748 X |

Primary Examiner—Robert E. Pulfrey
Assistant Examiner—Steven A. Bratlie
Attorney, Agent, or Firm—Carlsen, Carlsen & Sturm

[57] ABSTRACT

An implement for distributing and leveling top dressing material on ground surfaces in which a generally horizontal frame is operated forth and back by a handle, and includes a fore and aft central runner with laterally extending frame bars, which runner and bars support a forwardly bowed blade for initially engaging the material, and a rearwardly bowed but relatively longer blade arranged to engage material discharged around the outer ends of the forward blade. The runner edges project slightly below the bottom edge levels of the two blades to serve as a directional guide for the implement, and the two blades are preferably formed of semiresilient material so as to provide limited horizontal flexibility without permitting any substantial vertical yield to the bottom edges of the blades.

3 Claims, 4 Drawing Figures

PATENTED APR 2 1974 3,800,883
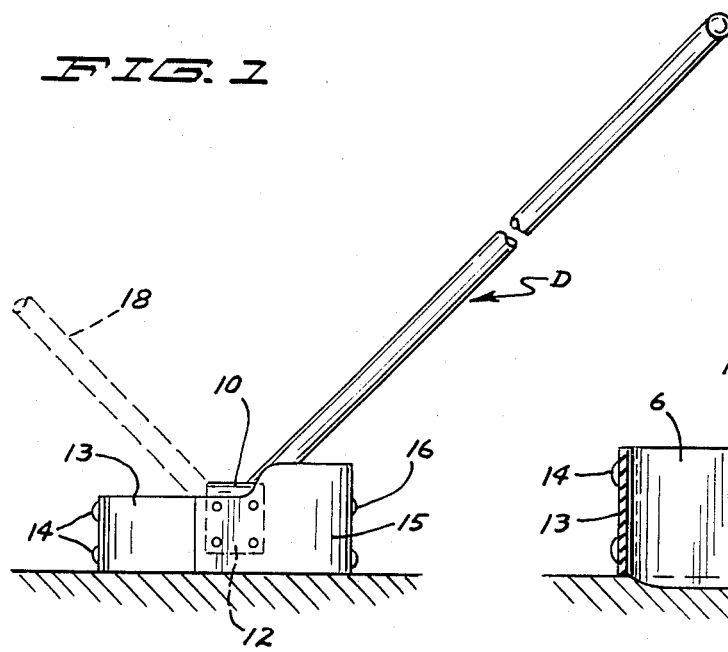
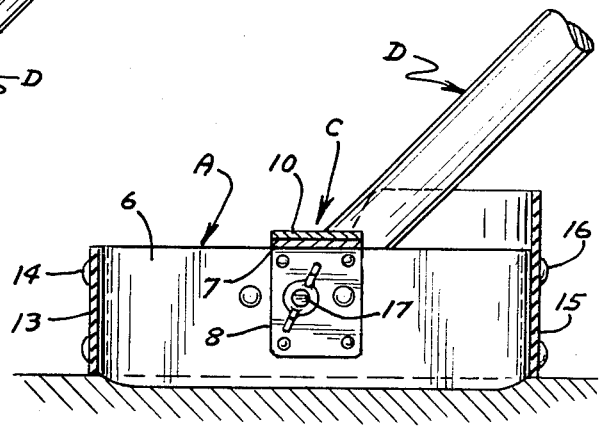
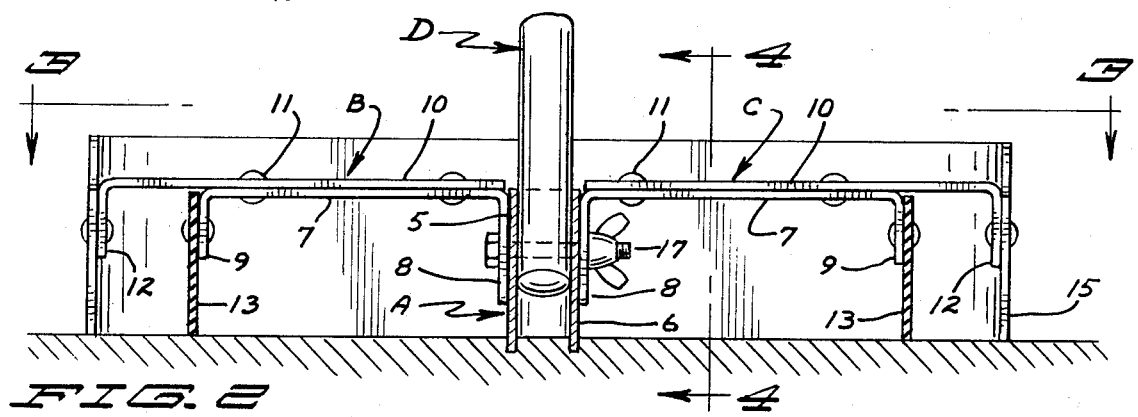
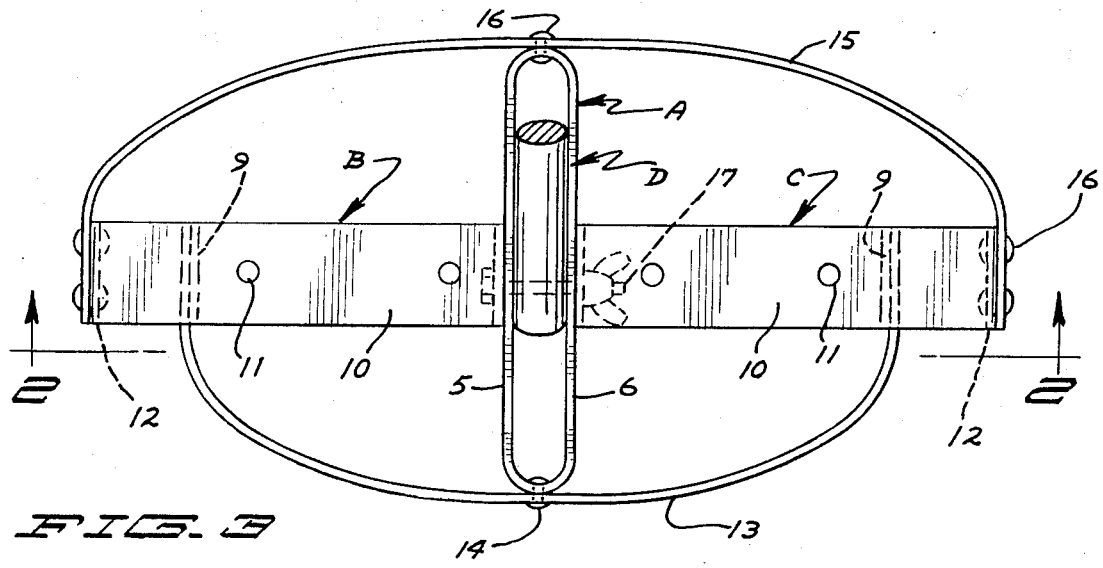

MANUAL MATERIAL SPREADER AND LEVELER

GENERAL OBJECTS OF THE INVENTION

This invention relates to improvements in apparatus primarily designed for use in conditioning grasslands such as found in golf courses, where surface uniformity is so highly desirable, and the general object is to provide an implement that is not only simple and economical in construction but is particularly efficient in spreading top-dressing evenly over the lawn. The device is also useful for other purposes such for instance as leveling the surface of soft soil preparatory to the planting of grass or other crop seed.

BRIEF DESCRIPTION OF THE DRAWING

In the accompanying drawing, which illustrates a preferred embodiment of the invention, FIG. 1 is a left side elevation of the device.

FIG. 2 is an enlarged sectional elevation, as on the line 2—2 in FIG. 3.

FIG. 3 is a plan view of the device, partly in section, as on line 3—3 in FIG. 2.

FIG. 4 is a sectional elevation as seen on line 4—4 in FIG. 2.

DESCRIPTION OF THE PREFERRED EMBODIMENT

Referring to the drawing more particularly and by reference characters, A designates a runner, the same being formed of a pair of transversely spaced parallel plates 5 and 6 integrally connected at their forward and rearward ends, respectively, as best shown in FIG. 3. Approximately midway of its ends the runner A is provided with laterally extending side beams B and C, each of which is rigidly secured to one of the runner plates so as to form a cross-like frame. Each side beam consists of an inverted U-shaped plate 7, the inner leg 8 of which is welded or otherwise rigidly anchored to the adjacent runner plate, while the outer leg 9 depends at some distance therefrom. Each beam also includes an extension of plate 7 in the form of an L-shaped upper plate 10 that is riveted to plate 7, as at 11, and has a depending leg 12 at its outer end.

A forwardly bowed blade 13 is riveted as at 14 or otherwise permanently secured, at its middle to the forward end of runner A, and its ends are bent back for secure attachment to the legs 9 of plate 7. In a similar but reverse manner a rear blade 15, of somewhat greater length than blade 13, is securely fastened at its middle, by rivets 16, to the rear end of runner A, while its ends are in turn secured to the legs 12 of beam extension 10.

As shown in FIGS. 2 and 4 the runner plates 5 and 6 extend downwardly below the bottom edges of the blades 13 and 15, so as to slightly cut into the ground surface, the purpose of this being to maintain the forth and back operation to rectilinear movements or at least resist any frictional tendency to irregular action. It will also be seen that the larger blade 15 extends somewhat higher than blade 13 in order that it may better handle the somewhat heavier work load to which it is normally subjected.

It may here also be noted that while the blades 13 and 15 may be made of any suitable material, such as spring steel, heavy flexible belting has been found to be very efficient and satisfactory.

The implement is manually manipulated by an operator grasping the handle D that is pivotally secured between the plates 5 and 6 by a bolt 17 which may be tightened to hold the handle in a pre-set inclined position to suit the convenience of the operator unless, of course, he may choose to leave it free to follow ground contour. In this connection it may further be noted that while the balde 13 has been referred to as being in a forward position, and the blade 15 in a rearward position, such designations are for convenience only, as the handle may be swung over and operated from the other side of the implement, as indicated by dotted lines 18 in FIG. 1, an arrangement which some operators may prefer under certain conditions.

In any event after the top dressing has been broadcasted or otherwise applied to the lawn, over a given section thereof, or loose soil is merely to be leveled off, the operator applies the implement and moves it forth and back, while gradually shifting it either to the right or left, and then preferably goes over the area again in a cross direction.

When moved in the direction in which blade 13 initially contacts the loose material the lower edge of that blade operates to create a leveling action while surplus material will work to both sides where it will form windrows that will then pass back into engagement with the inside surfaces of the outer ends of blade 15. It in turn will sweep such surplus material inwardly over the leveled strip to thereby fill in low spots not filled by blade 13 and produce a uniform distribution over the entire width of the implement. On the reverse movement, when the blade 15 initially contacts the material, the blade 13 will engage and work on the excess material that may have accumulated in the high medial portion of blade 15, while the excess material that does not pass under that blade will be moved to the outer extremities where it will be left in windrows for overlapping successive passes or for treatment by the cross travel operations above referred to.

Having illustrated and described a preferred embodiment of my invention, what I claim to be new and desire to protect by Letters Patent is:

1. An implement for manually spreading material on the ground, comprising;
   a. a horizontally disposed frame composed in part of a centrally arranged fore-and-aft runner beam,
   b. a pair of side beams rigidly attached to the runner beam, intermediate the ends thereof, and extending laterally outwardly therefrom,
   c. a forwardly bowed front leveling blade attached at a point between its ends to the forward end of the runner beam, and with the outer ends of said blade being attached to the respective side beams at points inwardly of their outer ends,
   d. a rearwardly bowed rear leveling blade attached at a point between its ends to the rear end of the runner beam and with its outer ends attached to the respective side beams at points outwardly beyond the points of attachment of the front blade to the side beams, and
   e. a handle connected to the runner beam for operating the implement.

2. The implement set forth in claim 1 wherein the runner beam is disposed between the outer end portions of the leveling blades and projects down below a plane passing horizontally through the lower edge of said outer blade end portions.

3. The implement set forth in claim 1 wherein the baldes are made of flexible sheet material whereby the portions thereof between the points of attachment to the runner and side beam may yield in response to pressures of materials worked on during the operation of the implement.

* * * * *